United States Patent [19]

Roberts et al.

[11] Patent Number: 5,731,943

[45] Date of Patent: Mar. 24, 1998

[54] PROTECTIVE RELAY HAVING OUT-OF-STEP LOGIC CAPABILITY

[75] Inventors: Jeffrey B. Roberts, Moscow, Id.; Daqing Hou; Armando Guzman-Casillas, both of Pullman, Wash.

[73] Assignee: Schweitzer Engineering Laboratories, Inc., Pullman, Wash.

[21] Appl. No.: 582,770

[22] Filed: Jan. 4, 1996

[51] Int. Cl.$^6$ .................................................. H02H 3/18
[52] U.S. Cl. ......................................... 361/80; 324/522
[58] Field of Search .............................. 361/80, 78, 79, 361/62, 67, 81, 83, 88; 324/512, 622, 525

[56] References Cited

U.S. PATENT DOCUMENTS

| | | | |
|---|---|---|---|
| 4,825,323 | 4/1989 | Wilkinson | 361/67 |
| 5,367,426 | 11/1994 | Schweitzer, III | 361/80 |

Primary Examiner—Jeffrey A. Gaffin
Assistant Examiner—Sally C. Medley
Attorney, Agent, or Firm—Jensen & Puntigam, P.S.

[57] ABSTRACT

An out-of-step blocking circuit is established with two additional zones in the impedance plane, with the circuit determining the time that the positive sequence impedance takes to move between the two zones. The distance elements for selected zones of protection for the relay are blocked if the impedance moves between the two zones at a rate less than a first threshold. However, a trip signal results if the rate of change is greater than the first threshold but less than a second threshold, indicating an unstable swing. Further, an inner blinder zone is established in the impedance plane within the additional two zones of protection. If the positive sequence impedance entering that zone does not move from that zone within a certain time during an otherwise out-of-step condition, the blocking signals are terminated.

11 Claims, 4 Drawing Sheets

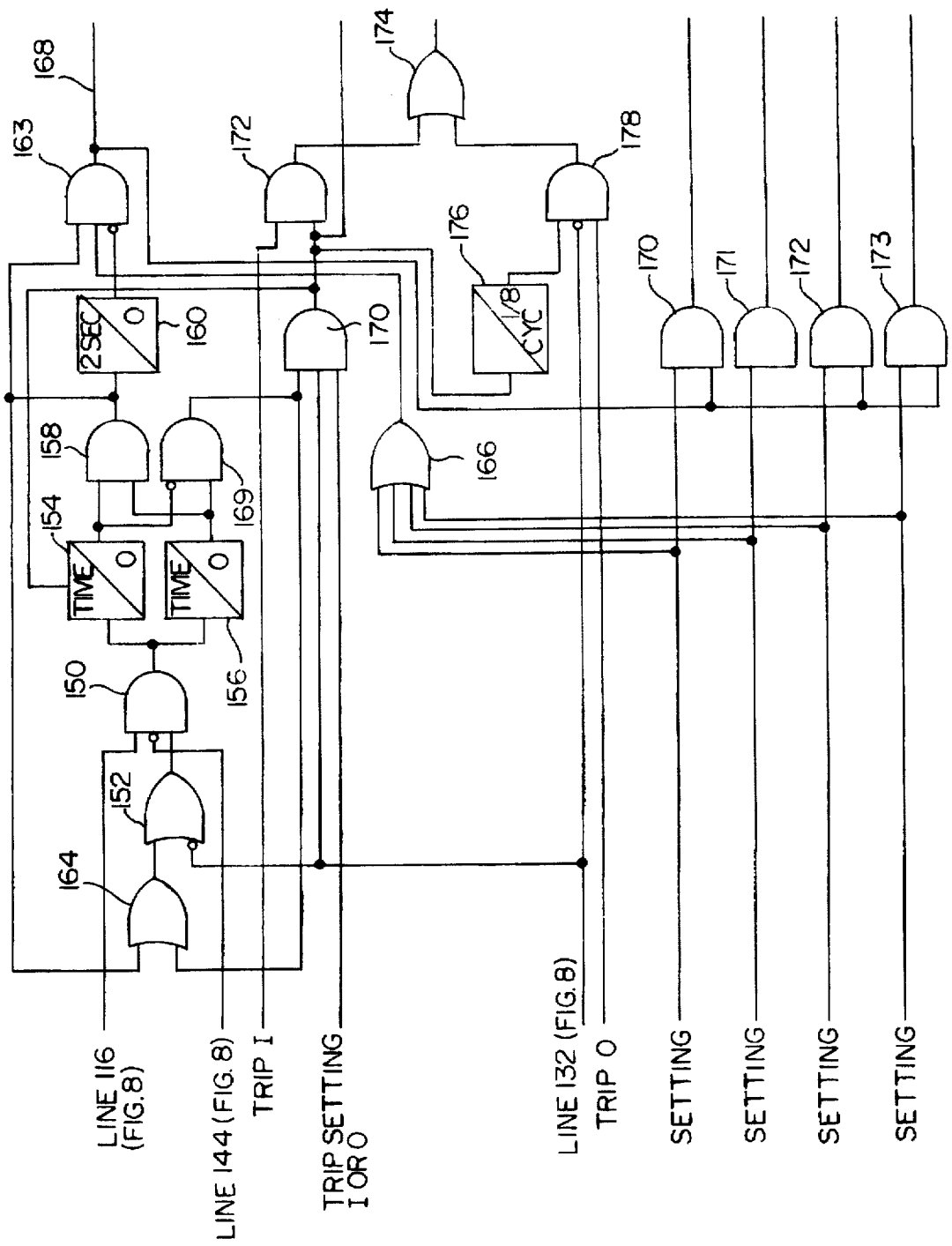

PROTECTIVE RELAY HAVING OUT-OF-STEP LOGIC CAPABILITY

TECHNICAL FIELD

This invention relates generally to the detection of a power swing condition in the operation of electric power systems, generally known as an out-of-step condition, and more particularly concerns distinguishing an out-of-step condition from a fault condition.

BACKGROUND OF THE INVENTION

In many power systems, particularly in less sophisticated ones such as might be found in lesser developed countries, a condition known as a power swing can occur. Power swings, particularly unstable power swings, are characterized by a loss of synchronism between various portions of the power system. If unstable power swings are not detected and corrected in sufficient time, the operation of the power system is disrupted and in the most severe cases, the system itself can collapse. Power swings are caused by various circumstances, including certain switching conditions within the system, or certain kinds of faults, or severe changes in system loading. During the course of such power swings, voltages and currents within the system can be quite large, which in turn can ultimately result in equipment damage and disruption of portions or all of the power system.

During a power swing, distance elements in the power system protective relays, which form a part of the overall system protection, will activate, i.e. "pick up", as the apparent impedance on the power line protected by the relay may in fact come within one or more of the distance element tripping characteristics during the power swing. The pickup of the distance elements will result in "tripping" of the associated circuit breaker, opening the power line. However, if the power swing is such as to be recoverable within the system, or if the most appropriate control action is to trip a breaker in another portion of the system, it is desirable for the distance elements to not operate, i.e. not trip the associated breaker, in response to the power swing condition.

The distance elements themselves, however, cannot discriminate between power swings and true three-phase faults, for which tripping action is appropriate. Such determination is made by logic circuitry in the relay. The logic circuitry prevents the distance relays from operating during power swings while permitting a trip signal when a three-phase fault is present. The term "out-of-step" is also used to refer to the logic circuitry associated with the power swing condition in the protective relay.

As an example of a power swing between sending and receiving ends of a power line within a power system, assume that the receiving end is load-intensive and that the sending end is generation-intensive. Due to a number of different causes, the receiving end equipment can slow down due to a lack of received power and as a result demands an increase in power. The sending end, on the other hand, is speeding up so as to increase power while at the same time seeking a decrease in the demand for power from the receiving end. In such a situation, a potential power swing condition is established.

FIGS. 1 and 2 show a power swing condition which results from a phase fault. FIG. 1 shows power line connections between local and remote sources 12 and 14 along lines 16, 18, with relays 13, 15, 17 and 19.

Referring now to FIG. 2, when the power swing begins, the transmitted power decreases from a point of system equilibrium 20 on curve 21, which represents the power transfer between the sources before the fault, to point 24 on curve 25, which represents the power transfer between the sources during the fault, with all breakers closed. Immediately after reaching point 24 on curve 25, the system moves along curve 25 to point 27. The speed at which the system progresses between two points on any one curve depends substantially on the inertia of the power generator rotor. At point 27, breaker 13 on line 16 in FIG. 1 clears and the transmitted power increases to point 29 on curve 30, which is the power transfer curve when the first breaker clears (opens). The power transfer point now moves along curve 30 until breaker 15 on line 16 clears. This results in the power transfer characteristic moving up dramatically to point 32 on curve 33, which is the power transfer curve after removal of the fault.

As can be seen from FIG. 2, by the time that the power system reaches point 32 on curve 33, the sending end kinetic energy has significantly increased, as shown by the area labeled 35. This is due to the mechanical input to the power generator exceeding the electrical power output requirements at that point. With the phase fault now removed from the system by operation of the circuit breakers, the inequality of the sending and receiving end power requirements (the power is now substantially above equilibrium) results in a power swing. The power swing continues from point 32 to point 37. By this time, the additional kinetic energy from the sending end has been absorbed by the load at the receiving end.

At this precise time, area 35 is equal to area 39 and the power system is momentarily in equilibrium. However, the electrical output of the sending end has now exceeded the input, and the swing starts to reverse. The swing will follow curve 33 to a point below the line of equilibrium 31, at which point the power system swing again reverses, continuing until generator control action or switching system action occurs to control the swing and bring the system back to equilibrium. This "swinging" of system demand versus system input, as noted above, is referred to as an out-of-step condition. The present invention detects out-of-step conditions, but discriminates an out-of-step condition from a three-phase fault condition, including the detection of a three-phase fault during a power swing.

In response to detection of a power swing, selected distance elements in the relay are prevented from asserting, i.e. tripping their associated circuit breakers. However, if a fault condition is detected, then the distance elements are unblocked, so that tripping of the breakers can occur.

DISCLOSURE OF THE INVENTION

Accordingly, the present invention is an apparatus for determining an out-of-step condition in a protective relay for power systems, comprising: means for determining the change of said impedance over time and comparing said change over time against preestablished values, when said impedance has an impedance value which moves into selected ranges during said change; means for blocking operation of distance elements in the protective relay associated with selected impedance plane zones of protection of said relay if the change over time is slower than a first threshold value; and means for preventing the blocking of operation of the distance elements if the rate of change is faster than said first threshold value but slower than a second threshold value.

BRIEF DESCRIPTION OF THE DRAWINGS

FIG. 9 is a logic diagram showing additional logic of the system of the present invention.

BEST MODE FOR CARRYING OUT THE INVENTION

Figure 3A:
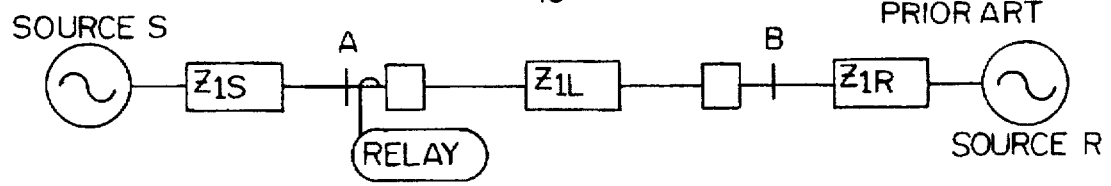
FIGS. 3A and 3B are single line and positive sequence diagrams for a power line.
Figure 3B:
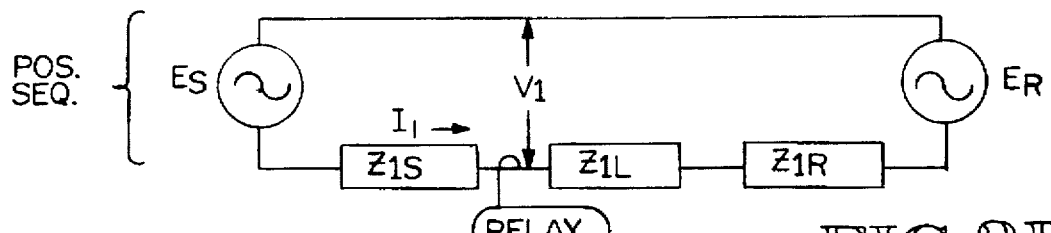
Figure 2:
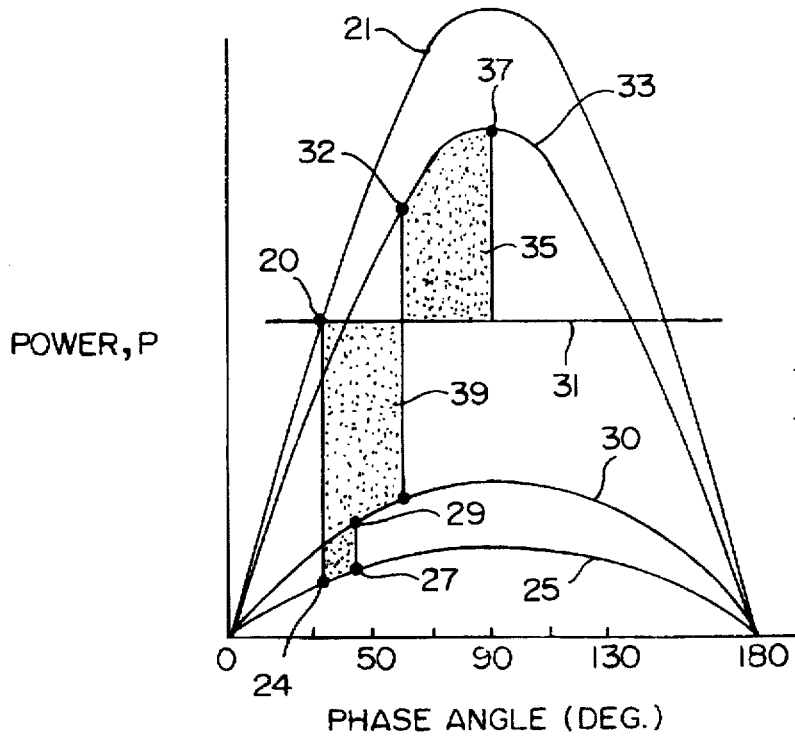
FIG. 2 is a diagram showing several power transfer curves between two sources for a selected sequence of power line conditions.

In the out-of-step logic system of the present invention, the positive sequence impedance on the power line is first determined from the positive sequence current and positive sequence voltage on the power line protected by the relay; its rate of change is then analyzed against several logic-implemented tests, discussed in detail below. The positive sequence current is $I_1$.

$$I_1 = \frac{(E_S - E_R)}{(Z_{1_S} + Z_{1_L} + Z_{1_R})}$$

where $E_S$ and $E_R$=the source and remote voltages, respectively, while $Z_{1S}$, $Z_{1L}$ and $Z_{1R}$=positive sequence source, line and remote impedances, respectively. FIGS. 3A and 3B show the single line and the positive sequence network diagrams, respectively. The positive sequence voltage is $V_1$.

$$V_1 = E_S - I_1 \cdot Z_S = E_S - [(E_S - E_R)/Z_{1_S} + Z_{1_L} + Z_{1_R}] Z_{1_S}$$

Since $Z_1 = V_1/I_1$, then $$Z_1 = [E_S/E_S - E_R] \cdot (Z_{1_S} \cdot 0 \ Z_{1_L} + Z_{1_R}) - Z_{1_S}$$

Using $E_R$ as the reference voltage, at an angle of 0 degrees, the angle of $E_S$ ($\Theta$) can be varied and the apparent impedance $Z_1$ seen by the relay can be calculated. Let n be a scaler quantity defined as:

$$\frac{|E_S|}{|E_R|}$$

This scalar quantity can be used to multiply $E_S$ to compensate for magnitude differences between the sending and receiving end voltages.

$$E_S/E_S - E_R = [n \cdot (\cos \Theta + j \cdot \sin \Theta)/[(n \cdot (\cos \Theta) + j \cdot \sin \Theta) - 1] = [n \cdot (n - \cos \Theta) - j \cdot \sin \Theta)/[(n - \cos \Theta \cdot (n - \cos \Theta) + (\sin \Theta) \cdot (\sin \Theta)]$$

For the case of n=1:

$$E_S/E_S - E_R = \frac{1}{2}[1 - j \cdot \cot(\Theta/2)]$$

Then:

$$Z_1 = \frac{1}{2} \cdot (Z_{1_S} + Z_{1_L} + Z_{1_R}) \cdot [1 - j \cdot \cot(\Theta/2)] - Z_{1_S}$$

Figure 4:
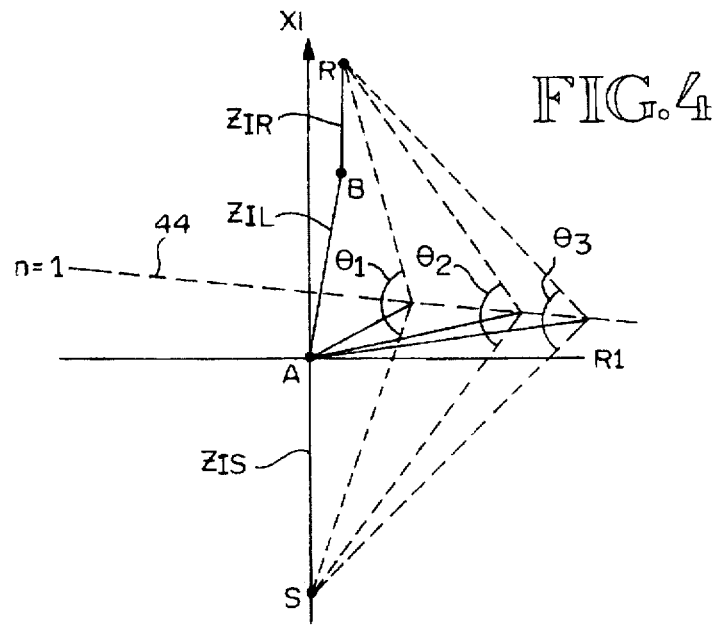
FIG. 4 is an impedance diagram for a power swing for a particular power system condition.
Figure 5:
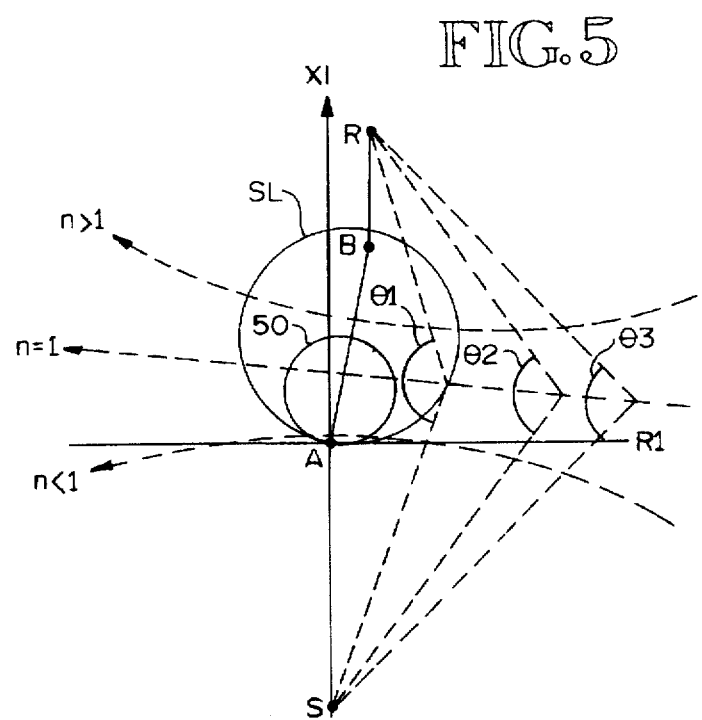
FIG. 5 is an impedance diagram for a power swing for several other system conditions.

FIG. 4 is an impedance plane diagram showing values of $Z_1$ for n=1 and three different values of $\Theta$. The separate $Z_{1S}$, $Z_{1L}$ and $Z_{1R}$ impedance values are also shown. Connecting the calculated values of $Z_1$ for the three different values of $\Theta$ results in a straight line 44. This line is a perpendicular bisection of an imaginary straight line connecting sources S and R. Line 44 is the "swing trajectory" of $Z_1$ for the system for n=1. FIG. 5 shows a similar swing trajectory for various system conditions (n>1, n=1 and n<1) and also with two forward zones of protection, shown at 50 and 52. As can be seen, during the power swing, the trajectories of n=1 and n<1 move through the zone 1 protective circle and would ordinarily result in the zone 1 phase distance elements operating. For a system condition where n>1, however, only the zone 2 distance elements operate.

Figure 6:
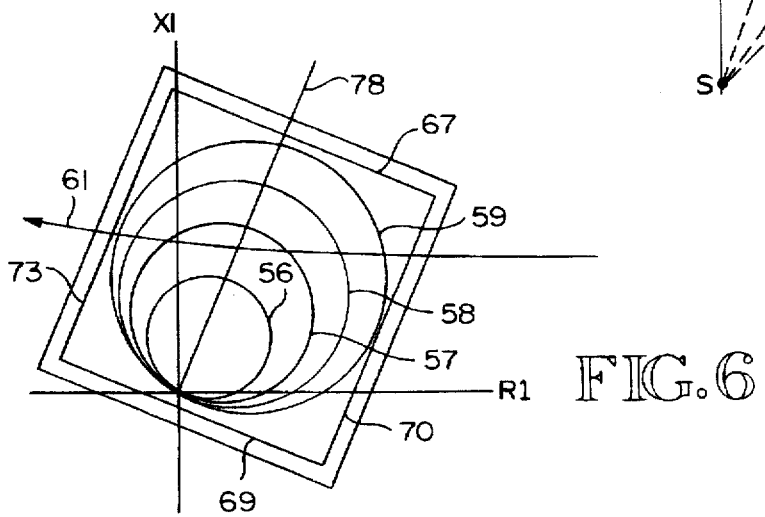
FIG. 6 is an impedance diagram illustrating the operation of the system of the present invention.

FIG. 6 illustrates the basic approach of the present invention to detect an out-of-step power system condition. The out-of-step logic circuitry uses the rate of change of the positive sequence impedance to make a determination between a possible out-of-step condition and a possible three-phase fault condition. FIG. 6 for illustration shows four zones (1–4) of protection for a protective relay, at circles 56 through 59. FIG. 6 also shows a swing trajectory line 61, which is the change in system $Z_1$ (positive sequence impedance).

The present invention establishes two concentric polygon-shaped "logic" zones outside of zone 4 (circle 59) in the impedance plane. These additional zones are referred to herein as zone 5 and zone 6 characteristics. The boundaries of zones 5 and 6 are established with four independent settings for each zone. For example, for the zone 5 characteristic, upper and lower thresholds are established for reactance, while the right and left thresholds are for resistance. The real and imaginary values of $Z_1$ are then compared against the zone 5 and zone 6 boundaries.

For the zone 5 characteristic to assert, i.e. be true, the imaginary part (reactance) of the positive sequence impedance $Z_1$ must be less than the upper reactance threshold line 67, referred to as $X_1T_5$ ("top" reactance line of zone 5), and greater than the lower (bottom) reactance line 69, referred to as $X_1B_5$. In addition, the real part of impedance $Z_1$ must be less than the right side resistive threshold line 70, referred to as $R_1R_5$ (right resistance line of zone 5), while greater than the left side resistive threshold line 73, referred to as $R_1L_5$.

As indicated above, for the zone 5 characteristic to assert in the present logic circuit, the positive sequence voltage must be within the zone 5 polygon. The boundaries of zone 6 are established similarly, but with slightly greater thresholds.

The settings for the various boundaries for zones 5 and 6 are selectable by the operator of the relays. In setting those thresholds, it is important that the expected load impedance of the system during normal operations would not end up inside either zone 5 or zone 6, as this condition of normal operation would initiate (undesirably) the out-of-step logic calculations, as discussed in more detail below. A normal range for the reactance thresholds for zones 5 and 6 for 1 amp nominal currents would be in the range of 0 to ±480 Ohms, while the resistance thresholds would be 0 to ±350 Ohms. These values would be divided by 5 for 5 amp nominal currents. The zone 6 thresholds, as indicated above, will be outside of the zone 5 thresholds.

In addition to the above, certain other restrictions on settings are made. For instance, the top reactive boundary for zone 6 must be at least 0.1 Ohm greater than the top reactive boundary of zone 5. The bottom reactive boundary of zone 5 must also be 0.1 Ohm greater than the bottom reactive boundary of the zone 6. The right and left boundaries for the zone 5 and zone 6 must also be separated by at least 0.1 Ohm. An example of typical zone 5 and zone 6 settings is 10 and 12 ohms, respectively, although this may be varied considerably, depending on the particular power system.

As indicated above, power swing conditions and three-phase faults both involve all three phases of the power system. From the swing trajectory plot of positive sequence impedance alone, it cannot be determined whether a phase distance element should trip (for a three-phase fault) or restrain (for an out-of-step power swing condition). Since the rate at which the positive sequence impedance changes for a power swing is much slower than that for a three-phase fault, the rate of change can be used to make the determination.

Figure 1:
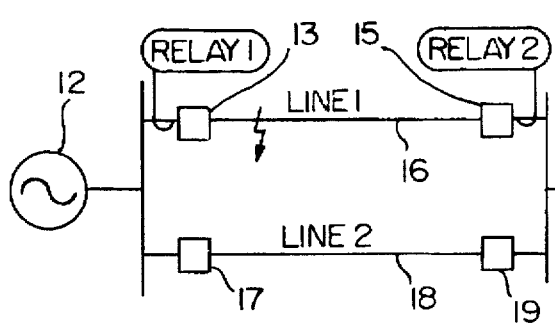
FIG. 1 is a simplified block diagram of a power system line configuration showing local and remote sources.

This is done by a logic circuit which measures the time difference between the successive operation of the zone 6 and zone 5 elements shown in FIG. 1, i.e. the time between the $Z_1$ impedance entering zone 6 and then entering zone 5. If this time is relatively slow, as indicated by a relatively long time period between the successive pickups of the zone 6 and zone 5 elements, then a conventional power swing has been identified. No power swing is identified if zone 6 and zone 5 elements are not picked up. However, if this rate of change is rapid, then the condition is a three-phase fault.

Once the logic circuit initially declares an out-of-step condition, the relay blocks the selected phase distance elements until either the $Z_1$ impedance exits zone 6, or a two-second timer expires. However, if a three-phase fault were to develop shortly after the relay initially determines that an out-of-step condition exists, then the relay could not trip, as it should, until the blocking action of the out-of-step circuitry runs its course. This shortcoming, which is present in existing out-of-step logic systems, is overcome by providing an inner "blinder" zone in the impedance plane which is a narrow zone within zone 5 around the system line angle, shown at line 78, which is the replica line impedance of the power line, a known value.

Figure 7:
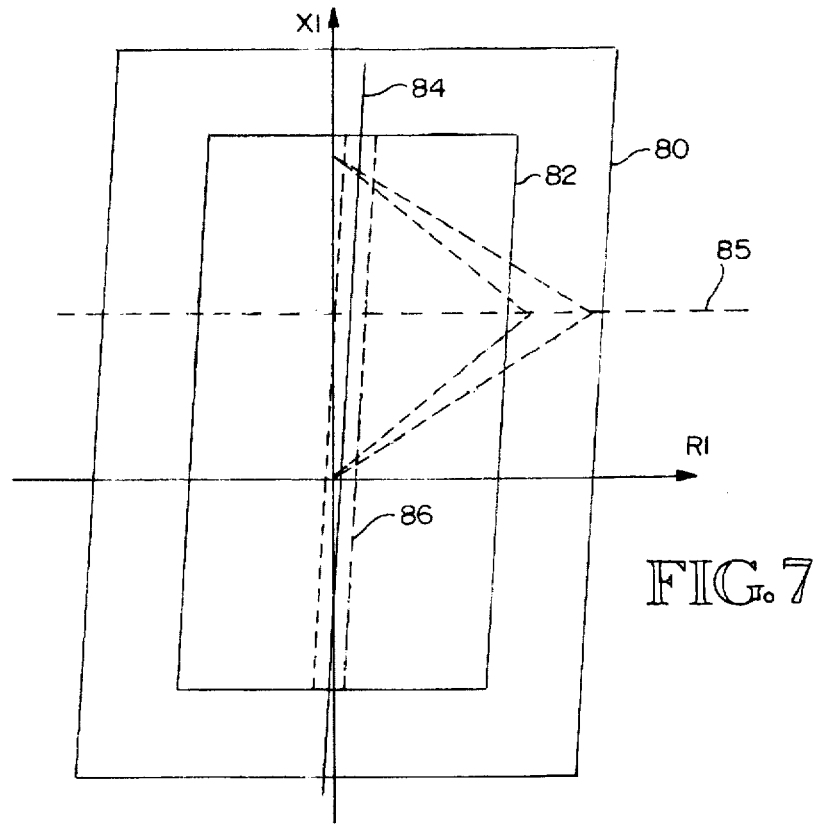
FIG. 7 is an impedance diagram showing the operation of the present invention.

When a fault occurs during an existing out-of-step condition, the $Z_1$ impedance moves immediately to the line angle, if it was not already there, and remains at that point until the fault is removed. Thus, by detecting that the $Z_1$ impedance does not move outside of the narrow blinder area adjacent the line angle of replica impedance for a selected time, it can be reliably concluded that a power swing has evolved into a fault. The blinder region mentioned above is a small area on either side of the replica fault line. This is shown most clearly in FIG. 7, which also shows the zone 5 and zone 6 boundaries (for a relay reaching four zones of protection with up to four sets of distance elements). FIG. 7 thus shows the zone 6 boundary 80, the zone 5 boundary 82, the replica line impedance 84, and the inner blinder zone 86, as well as the swing of $Z_1$ at 85.

In addition to determining the amount of time that the $Z_1$ impedance takes to move on its swing trajectory between the zone 6 and zone 5 boundaries, the present invention also determines whether or not the $Z_1$ impedance remains in the inner blinder zone 86 past a prescribed time if $Z_1$ reaches the blinder zone during the out-of-step blocking time. If in fact a fault condition is recognized, the distance elements which have previously been blocked by the action of the out-of-step logic circuitry are now unblocked and the associated circuit breaker for the line tripped.

Figure 8:
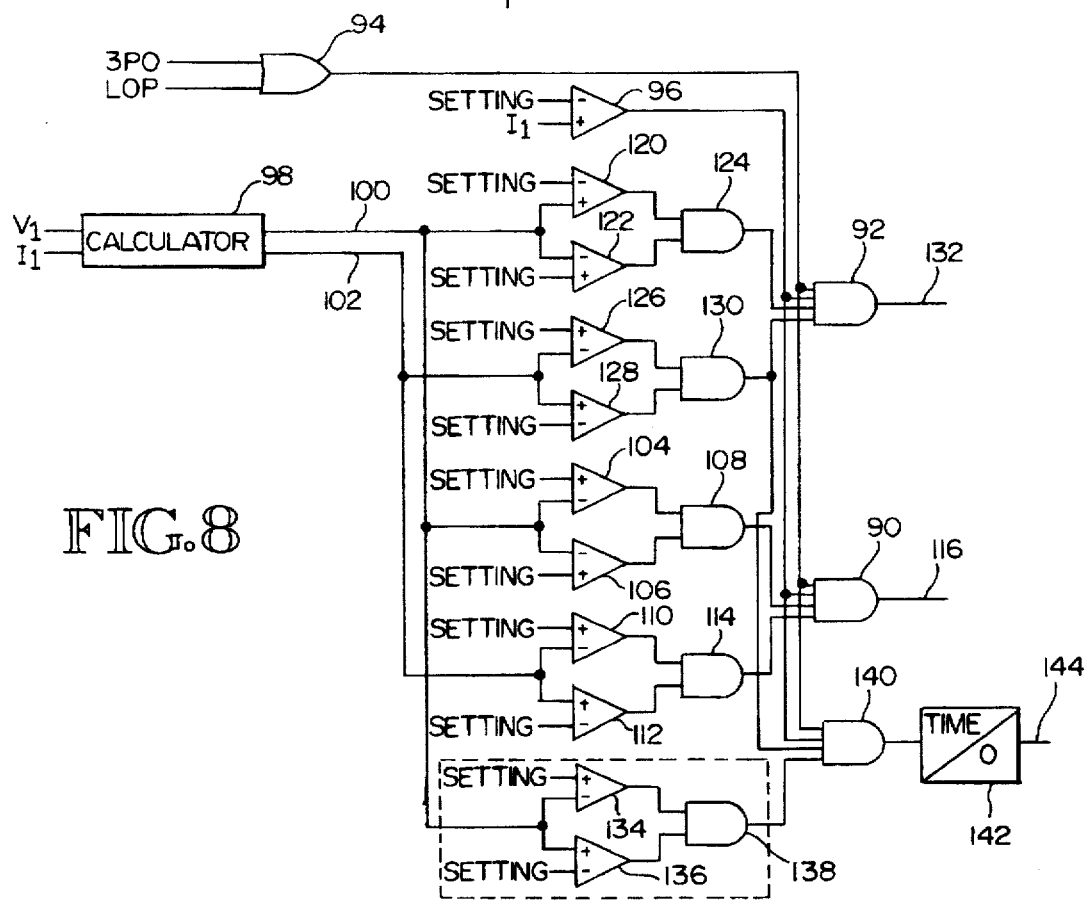
FIG. 8 is a logic diagram showing a portion of the system of the present invention.

The logic to accomplish these functions is shown in FIGS. 8 and 9. In FIG. 8, three specific output signals are produced which are then used by the remaining logic circuitry of FIG. 9. A high output from AND gate 90 in FIG. 8 indicates that the $Z_1$ impedance (positive sequence impedance) has entered zone 6, while a high output from AND gate 92 indicates the $Z_1$ impedance has entered zone 5. AND gate 90 has a NOT input from OR gate 94, the inputs to which are signals indicating an existing three-pole-open circuit condition (3PO) or a loss-of-potential condition (LOP), both of which are sensed by other conventional circuits in the protective relay.

The presence of either one of these signals disables zone 6 AND gate 90 (as well as zone 5 AND gate 92). Hence, the out-of-step logic circuitry is blocked if either a three-pole-open condition or a loss-of-potential condition exists on the power system. In addition, a minimum positive sequence current is also required. This is provided by a comparator 96, the output of which is applied to AND gate 90 and AND gate 92. Hence, a minimal positive sequence current e.g. 1 amp, must be present on the line to enable the out-of-step circuitry.

The "position" of the positive sequence impedance relative to zones 5 and 6 is used as the input for the logic circuit of FIG. 9. Referring to FIG. 8, the positive sequence impedance is calculated from three-phase voltages and currents. This is different than the typical positive sequence calculation for out-of-step circuit systems, which use only one phase, although such determination of positive sequence impedance is otherwise well known. Calculator 98 determines the positive sequence impedance and then provides the real and imaginary parts thereof on output lines 100 and 102, respectively.

The real part (resistance) of $Z_1$ on line 100 is applied at one input of comparators 104 and 106. This value is applied against the previously established right and left boundary resistive settings for zone 6. If the real part of $Z_1$ is less (less positive) than the right hand resistive boundary, the output of comparator 104 is high and if it is greater (more positive) than the left hand resistive boundary, the output of comparator 106 will be high. The outputs of comparators 104 and 106 are applied to an AND gate 108, which provides a third input to AND gate 90, if the inputs are both high.

The imaginary part of the positive sequence impedance on line 102 is applied to comparators 110 and 112. These comparators compare the imaginary (reactance) part of $Z_1$ against the previously established reactive boundaries for zone 6. If the imaginary value is less (less positive) than the top reactive setting of zone 6, then the output of comparator 110 is high and if the imaginary part is larger (more positive) than the bottom reactive boundary of zone 6, then the output of comparator 112 is high. The outputs of comparators 110 and 112 are applied to AND gate 114. When both inputs are high, the output of AND gate 114 is high and is applied as a fourth input to AND gate 90.

The coincidence of high outputs from AND gates 108 and 114, as well as a low output from OR gate 94 and a high output from comparator 96 results in a high output on output line 116 from AND gate 90, indicating that the positive sequence impedance has entered zone 6 (FIG. 7).

The real part of the positive sequence impedance, on line 100, is also applied to comparators 120 and 122. If the real part is less positive than the right side resistive boundary setting for zone 5 and greater than the left side resistive boundary setting, the outputs of both comparators 120 and 122 are high, and are applied to AND gate 124, the resulting high output of which is applied to AND gate 92. The imaginary portion of the positive sequence impedance, on line 102, is applied to comparators 126 and 128. If the imaginary part is less than the top reactive boundary setting and greater than the bottom reactive boundary setting for zone 5, the outputs of both comparators are high, which in turn produces a high output from AND gate 130, the output of which is applied to AND gate 92.

The coincidence of high inputs at AND gate 92 from AND gates 124 and 130, a low output from OR gate 94 and a high output from comparator 96 produces a high output on line 132 from AND gate 92. This indicates that the positive sequence impedance has passed into zone 5. Hence, the signals on lines 116 and 132 indicate in real time when the $Z_1$ impedance passes into zone 6 and then zone 5.

The real part of the positive sequence impedance is also applied on line 100 to comparators 134 and 136. These comparators compare the real value (resistance) against the right and left side inner blinder zone boundary settings. If the real portion of $Z_1$ is less than the right side boundary but greater than the left side boundary, the outputs of both comparators 134 and 136 are high, and the output of AND gate 138 to which these outputs are applied is high as well. The output of AND gate 138 is applied at one input to AND gate 140. The output of AND gate 130, which is the reactance boundary determination circuit for zone 5, is also applied to AND gate 140, as the reactance boundary of zone 5 is the same as for the inner blinder zone.

When the outputs of AND gates 130 and 138 are both high, the output of OR gate 94 is low and the output of comparator 96 is high, the output of AND gate 140 is high. This indicates that $Z_1$ has entered the inner blinder zone 86, shown in FIG. 6. The output of AND gate 140 initiates a timer 142. Timer 142 is an adaptive timer, in that the time setting is variable. This time will be different for different power swings and for different power system configurations.

In the embodiment shown, the value of timer 142 is set for the time which $Z_1$ requires to pass from zone 6 into zone 5 and then doubling that value. This is accomplished by timing circuitry relative to the appearance of signals on lines 116 and 132 in succession; the value of which is then doubled. Other multiplier values besides doubling may be used. Fast "swings" between zone 6 and zone 5 boundaries will thus have shorter times in timer 142 and vice versa.

Timer 142, once loaded with the calculated "adaptive" time, produces an output at the conclusion of that time on line 144. Hence, in effect, there is an output on line 144 when $Z_1$ has been inside the inner blinder zone for a preselected "adaptive" time. This, as indicated above, is indicative of a fault condition which may occur during the occurrence of an out-of-step condition.

The outputs on lines 116, 132 and 144 are applied as inputs to the remaining logic circuit of FIG. 9, as indicated above. The appearance of a high output on line 116 indicates that the $Z_1$ impedance has entered zone 6 (FIG. 7). This signal is applied as one input to AND gate 150. The output on line 144 from timer 142 is applied at a NOT input to AND gate 150. The other input to AND gate 150 is from OR gate 152. One input (a NOT input) to OR gate 152 is the signal on line 132 from FIG. 8. This input will be high as long as the $Z_1$ impedance has not yet entered zone 5. The coincidence of the above signals, i.e. $Z_1$ has entered zone 6 but not yet zone 5 and the inner blinder zone timer 142 has not timed out, will result in a high output from AND gate 150, which starts timers 154 and 156.

Timer 156 has a shorter time out than timer 154. The output of timer 156 (after it has timed out) is applied to AND gate 158. The other input to AND gate 158 is the output of timer 154. Hence, when both timers 154 and 156 time out, the output of AND gate 158 is high, which initiates a two-second timer 160. The output of two-second timer 160 (after it times out) is applied to a NOT input of AND gate 163. That input will thus be high until the two-second timer 160 times out, which terminates the blocking signal output from AND gate 163. The output of AND gate 158 is also applied as an input to AND gate 163 and as an input to OR gate 164. The other input to AND gate 163 is from OR gate 166, the inputs of which are settings, selected by the operator, indicating which relay zones of protection out of those possible (four in the embodiment shown) are to be blocked in the event of an out-of-step condition.

Hence, when at least one protection zone is to be blocked (i.e. the operation of the distance elements associated with that zone are blocked); when the $Z_1$ line impedance has entered zone 6 but has not yet entered zone 5, and timer 160 has not yet timed out, there will be a high output from AND gate 163 on line 168. This is a blocking signal which is then applied to AND gates 170–173, the other inputs of which are the operator selected settings of which protection zones are to be blocked. The output of AND gates 170–173 are the actual blocking signals which are then transmitted to the distance elements associated with the selected zones to be blocked, to block the operation thereof, i.e. prevent them from tripping the circuit breaker. This is the basic function of out-of-step circuits in general, i.e. to temporarily block the operation of distance elements.

The output of timer 156 is also applied to AND gate 169. The other input to AND gate 169 is a NOT input from timer 154. Hence, between the time that timer 154 times out (first) and timer 156 times out, AND gate 169 produces an output which is applied to AND gate 170, and also back as one input to OR gate 164. The input signals to OR gate 164 from AND gates 169 and 158 results in the circuit being stabilized, i.e. "sealed", after zone 6 is entered by the $Z_1$ impedance swing.

Another input to AND gate 170 is the input from AND gate 92 on line 132, indicating that zone 5 has been entered by the $Z_1$ impedance. The third input to AND gate 170 is a "trip enable" operator setting. This is a setting which determines whether the out-of-step trip signal (a trip signal to unblock the distance elements during the out-of-step condition) is made as the $Z_1$ impedance moves into zone 5 (setting=I) or out of zone 5 (setting=O). This input is high if the "trip enable" setting is I or O; it is low if the setting is N (no setting). The output of AND gate 170 is applied as an input to AND gate 172. The other input to AND gate 172 is a trip enable "I" (if this setting is selected by the operator), which indicates tripping will occur upon entering zone 5 (if the trip conditions are met).

The output of AND gate 172 is one input to OR gate 174. The output of OR gate 174 is a trip signal which "unblocks" the distance elements, resulting in a tripping of the circuit breaker. Hence, if the swing has moved into zone 5 after timer 156 has timed out but before timer 154 has timed out (this is a very fast swing, which is unstable), and the trip enable setting is I, a trip signal from OR gate 174 is produced which basically overrides the blocking signal and results in tripping of the circuit breaker. This portion of the circuit is thus used to identify a "fast swing" tripping condition.

The output of AND gate 170 also resets timer 154. Still further, it initiates a one-eighth cycle timer 176. The output of timer 176 is high for one-eighth of a cycle after the output of AND gate 170 goes away, i.e. the timer output persists for ⅛ cycle after zone 5 drops out. The timer output is applied to AND gate 178. The other inputs to AND gate 178 are a NOT input from the zone 5 signal and a trip enable "O", which is the operator setting for a trip on the way out of zone 5. The output of AND gate 178 is applied to OR gate 174, which also results in a trip signal. Hence, a trip signal is possible during ⅛ of a cycle following the dropping out of zone 5, following timer 156 timing out and if the operator has selected trip enable setting O.

The inner blinder signal from line 144, an input to AND gate 150, provides protection for three-phase faults during the time that there is a blocking signal on line 168. It is not necessary to wait until timer 160 expires. When the inner blinder signal appears at AND gate 150, all of the follow-on logic drops out and the blocking signal on line 168 terminates.

Hence, in overall operation, a stable swing condition is declared and an out-of-step blocking signal occurs if the zone 6 element picks up, timers 154 and 156 expire before zone 5 picks up, there is no output from the inner blinder timer 142 and the two second timer 160 has not expired. The inner blinder timer output provides protection against a three phase fault which occurs during out-of-step blocking. The $Z_t$ swing is declared unstable (too fast) if the impedance enters zone 6 and then enters zone 5 after timer 156 expires but before 154 expires. Under these conditions, a trip signal is sent to the circuit breaker. The trip signal can be accomplished either upon entry of zone 5 or upon exit of zone 5, as selected by the operator.

The present invention thus preserves the possibility of tripping under selected conditions during an out-of-step blocking condition.

Although a preferred embodiment of the invention has been disclosed herein for illustration, it should be understood that various changes, modifications and substitutions may be incorporated in such embodiment without departing from the spirit of the invention, which is defined by the claims which follow.

What is claimed is:

1. An apparatus for determining an out-of-step condition in a protective relay for power systems, comprising:

means for determining the positive sequence impedance on a power line in a power system;

means for determining the change of said impedance over time and comparing said change over time against preestablished values, when said impedance has an impedance value which moves into selected impedance ranges during said change;

means for blocking operation of distance elements in the protective relay associated with selected impedance plane zones of protection of said relay if said change in impedance over time is slower than a first threshold value;

means for preventing the blocking of operation of the distance elements if said change in impedance over time is faster than said first threshold value but slower than a second threshold value; and means for terminating the blocking of operation of the distance elements if a three phase fault is recognized during said blocking.

2. An apparatus of claim 1, wherein the protective relay includes multiple zones of protection, each of which has associated therewith distance elements, and means for selecting which distance elements are to be blocked by the blocking means.

3. An apparatus of claim 2, wherein the determining means includes means for establishing two concentric additional zones outboard of the zones of protection in the impedance plane and for determining the relative timing of the positive sequence impedance entering in succession the additional zones, the two additional zones defining said selected ranges of impedance.

4. An apparatus of claim 3, wherein the determining means includes first and second timers, the second timer having a shorter time than the first timer, wherein the first and second timers are initiated upon entry of the positive sequence impedance into the most outboard additional zone, and wherein the operation of the distance elements is blocked in the event that the positive sequence impedance enters the least outboard additional zone after the first and second timers have both timed out.

5. An apparatus of claim 4, including means for operating the preventing means when the second timer has timed out but not the first timer and the positive sequence impedance enters the least outboard additional zone.

6. An apparatus of claim 4, including means for operating the preventing means when the second timer has timed out but not the first timer and the positive sequence impedance leaves the least outboard additional zone after having earlier entered it.

7. An apparatus of claim 4, including means for resetting the first timer when said change in impedance is faster than said first threshold but slower than said second threshold.

8. An apparatus of claim 4, including means for terminating the blocking operation following expiration of a selected time.

9. An apparatus of claim 4, wherein the first and second timers are programmable.

10. An apparatus of claim 3, including means for establishing an inner blinder zone inside of said two additional zones, means for determining whether the positive sequence impedance enters the blinder zone, means for determining whether the impedance remains within the blinder zone for a selected period of time and means for terminating the blocking operation if the selected period of time is exceeded.

11. An apparatus of claim 8, including means for varying the selected period of time, depending upon the time for the impedance to move between said two additional zones of impedance.

* * * * *